Sheet 1. 2 Sheets.

J. Pepper Jr.
Knitting Machine.

No. 1,555.

Reissued Oct. 27, 1863.

J. Pepper Jr.
Knitting Machine.

No. 1,555. Reissued Oct. 27, 1863.

UNITED STATES PATENT OFFICE.

JOHN PEPPER, OF HOLDERNESS, NEW HAMPSHIRE.

IMPROVEMENT IN CIRCULAR-KNITTING MACHINES.

Specification forming part of Letters Patent No. 12,046, dated December 5, 1854; Reissue No. 1,555. dated October 27, 1863.

*To all whom it may concern:*

Be it known that I, JOHN PEPPER, of Holderness, in the county of Grafton and State of New Hampshire, have invented a new and Improved Machine for Knitting Ribbed Work, of which the following is a full, clear, and exact description, reference being had to the accompanying drawings, making part of this specification, in which—

Figure 1:
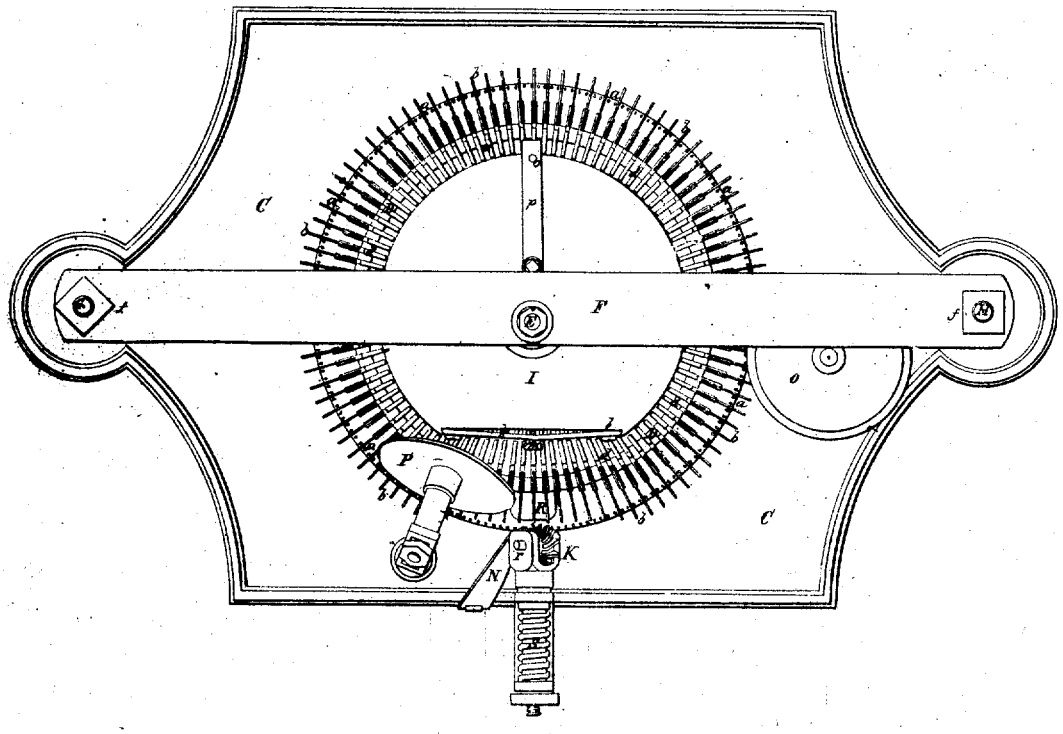
Figure 2:
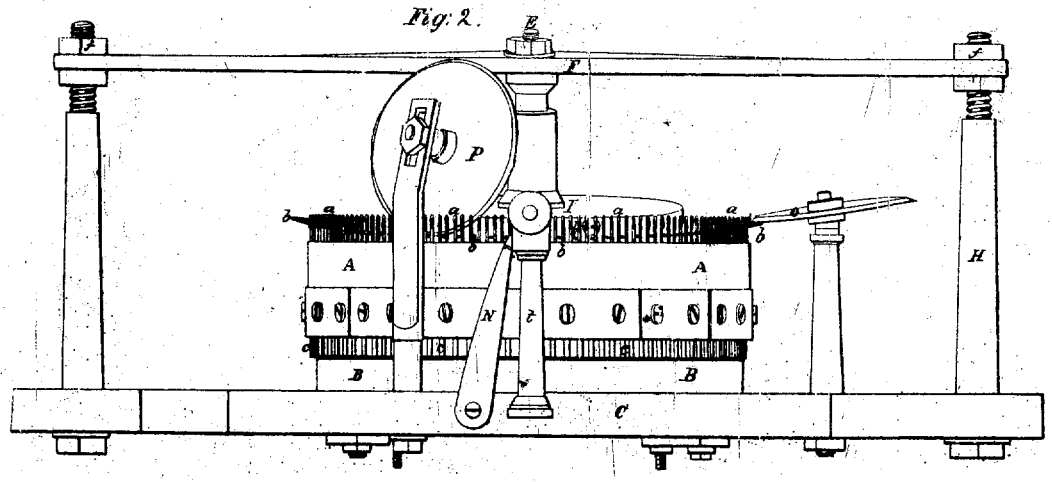
Figure 3:
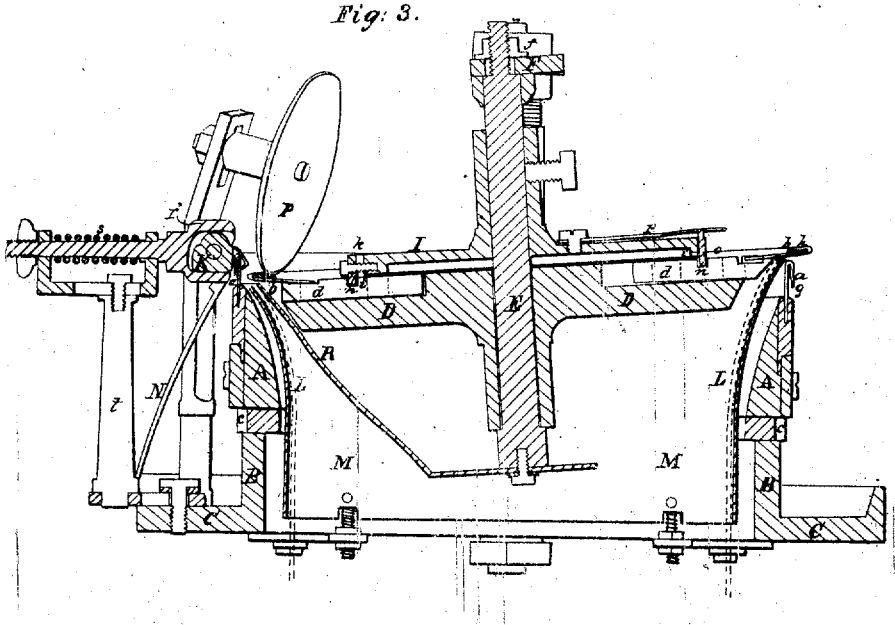

Figure 1 is a plan of my machine; Fig. 2, a front elevation; Fig. 3, a central vertical and transverse section; Figs. 4, 5, 6, 7, and 8, details to be referred to hereinafter.

In the knitting-machines heretofore constructed the needles have been secured rigidly to a bar or other device, to which the requisite motions were imparted to operate the needles. Machines having their needles thus connected and operated singly could not be made to work rapidly; and the first part of my present invention has for its object to remedy this difficulty, as well as to diminish the expense of building the machines and the power required to run them. This part of my invention consists in detaching the needles from the bar or device which supports them, (which I now make stationary,) and in operating them in sections of two, three, four, or more at a time and in continued succession by a suitable cam or other device, which acts directly upon the bent-up ends of the needles, which projects and withdraws them one section after the other, as will be hereafter more particularly described.

Ribbed work has heretofore been made upon a plain or straight machine, the articles being subsequently sewed up. This method is liable to several objections, for, besides the expense of sewing up the articles after they are knit, there was an additional one arising from the very slow rate at which the plain machines run in comparison with the circular machines. The latter, however, have never been constructed so as to knit "ribbed work." And the second part of my invention has for its object to enable such work to be knit upon circular machines, which work four or five times faster than the straight machines. This part of my invention consists in the use of a set of ribbing-needles, in combination with the plain-work needles of a circular machine, the ribbing-needles being arranged to radiate from a center and to intersect the plane of the plain needles at an angle more or less acute, whereby I am enabled to knit ribbed circular work upon a circular machine, and thus to effect great saving in the expense of producing such work.

It is obvious that where the needles are actuated separately, one after the other, by a cam or lip, as in the machine represented in the accompanying drawings, some method must be devised for the purpose of introducing the needles into the machine and of withdrawing them therefrom, while at the same time it will not answer to interrupt the continuity of the cam which operates them. For this purpose I make a portion of the cam or lip which actuates the needles removable at pleasure, so that it may be taken out when the needles are to be introduced or withdrawn and again replaced to complete the continuity of the operating-cam, and this forms the third part of my invention.

The fourth part of my invention consists in making that portion of the cam or lip that withdraws the ribbing-needles from the plain needles adjustable for the purpose of lengthening or shortening the stitches, as may be required.

It is obvious where two sets of needles are employed, whether they be nearly at right angles with each other (as in the drawings) or whether they be placed upon the surface of a cam and form more acute angles with each other, that a portion of the upper set must be below the heads of the needles of the other set at the point where the stitches are formed, while the opposite needles of the upper set must be above the heads of the corresponding needles of the lower set, for the purpose of drawing the work off the needles. One method of accomplishing this is represented in the accompanying drawings, and consists in so inclining the axis of rotation of the two sets of needles to each other that the plane of one set shall dip below the heads of the other set at the point where the stitches are formed, and shall rise above the heads of these needles at the opposite point, and this constitutes the fifth part of my invention.

That others skilled in the art may understand my invention, I will proceed to describe the manner in which it is carried out.

The hooked needles *a* of the first series are arranged in a circle, and stand vertically with their upper ends on a level. They are all affixed to the end of a cylinder, A, which rests upon a circular flange, B, rising from the bed-plate C, and is made to revolve in a horizontal plane by means of power applied to a toothed pinion, (not seen in the drawings,) which engages with gear-teeth *c* around the outer surface of the cylinder. The ribbing-needles *b* are secured each one to a separate slide, *d*, Figs. 1, 3, and 5.

Figure 6:
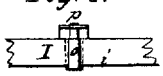
Figure 5:
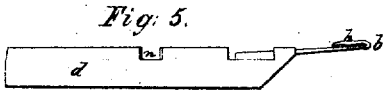

In the machine represented in the accompanying drawings these needles are arranged in a plane obliquely intersecting the cylinder of rotation of the first series, and, together with their slides *d*, they are supported by and made to slide radially upon the top of a circular table or wheel, D, which turns freely upon a stationary axle, E. This axle is suspended from a cross-bar, F, which is supported over the needles by two posts or standards, G H, the elevation of the second series of needles with respect to the first series being regulated by the nuts *f* and screws upon the tops of the standards. The needles *b* of the second series are moved to and from those of the first series by means of a lip or flange, *i*, projecting down from a stationary cam-plate, I, which is secured to the axle E immediately above the table D, and parallel thereto, the lip entering notches *n* in the slides *d*, to which the needles are secured. A large portion of the lip *i* (about five-sixths of its length) is circular, but where the needles *b* require to be drawn in from between the vertical needles *a* and again projected out it is formed as seen in the lower portion of Fig. 4. This portion of the lip *i* is formed of a spring-plate *k*, attached to the plate I by two screws, *l*, which pass through elongated holes in the spring-plate, and into the middle of this plate a screw, *m*, is tapped, and made to abut against the cam-plate. By means of this adjusting-screw the spring-plate *k* is moved more or less in or out, and thus the extent of motion of the ribbing-needles *b* from the other series of needles *a* is regulated, and the required length of the loops, and the consequent tightness or looseness of the work, is attained. While the slides *d* are passing beneath the circular or concentric portion of the lip *i* they will be moved neither in nor out between the needles of the other set, as seen in Fig. 1. A small portion, *o*, of the lip *i* is made removable, and is attached to a spring, *p*, fastened to the top of the cam-plate, Figs. 1, 3, and 4. A front view of this part *o* and a portion of the lip *i* are shown in Fig. 6. By raising the spring *p* the part *o* can be lifted from the lip, and the needle-slides *d* and needles *b* introduced into or withdrawn from the recesses in the wheel D, in which they slide. The part *o* should be made of a width exceeding that of the needle-slides, that the latter may be easily introduced.

It has already been mentioned that the needles *a* are revolved by means of a driving-pinion which engages with the teeth *c* of a wheel upon the exterior surface of the cylinder A, to which these needles are attached, and that the plate D, on which the second series of needles slide, turns freely on an axle, E, and as the needles of the one series pass in between those of the other it is manifest that the upper series will be carried around by the lower series as the latter are revolved.

It is evident that the yarn laid upon the needles of the first series by the toothed sinker-wheel K must be laid in the form of loops upon the needles of the second series. In the machine represented in the accompanying drawings this is accomplished by inclining the plane of rotation of the second series of needles to the needles of the first series, each horizontal needle being depressed below the barb of the vertical needles at that portion of its revolution where the yarn is laid on and while passing to the opposite point of its revolution, gradually ascending to a point above the tops of the vertical needles.

The work or fabric L, Fig. 3, is supported upon a tubular rest, M, within the cylinder A, which is fastened to the base-plate or main frame of the machine by such contrivances as will admit of its correct adjustment. The upper edge of the rest M is extended up nearly to the under sides of the needles of the second series, there being a space between it and the needles sufficient for the passage of the work, which hangs from the needles and within the rest M, as seen in the drawings.

Figure 7:
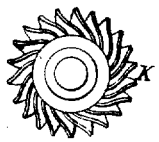
Figure 8:
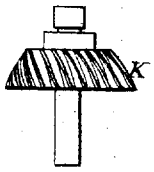
Figure 4:
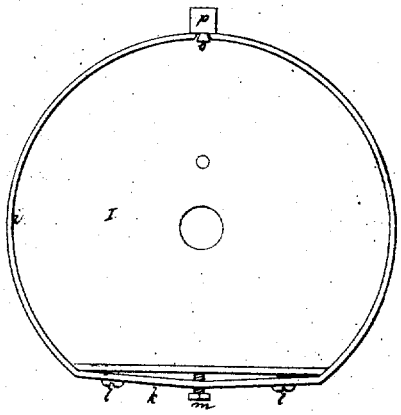

The rotary sinker or toothed wheel K is represented in top view in Fig. 7 and in side view in Fig. 8. It is supported by and revolves freely within a frame, *r*, that is forced toward the first series of needles by a spring, *s*, the whole being sustained on the top of a standard or post, *t*, and arranged as seen in the drawings. Near the sinker-wheel is the yarn-guide N, through which the yarn is conducted to the sinker-wheel. The said sinker is to be constructed and made to operate like those in use in the common French rotary knitting-looms, for knitting plain or unribbed work. Its teeth engage with the range of needles, and lay the yarn in a corrugated or crimped form on the needles, and raise it up between their barbs and shanks, or into their hooks, the rotation of the sinker-wheel being produced by the rotary movement of the first series of needles.

To each set or series of needles there is applied a rotary wheel presser, O or P, so arranged as ts revolve freely on its supporting axle, and to close the barbs down upon the shanks of the needles at the proper time, or just before the stitch of a needle is to be cast off or over the loop upon it in order to form a new stitch.

In order to keep the work down at a sufficient distance from the sinker-wheel, I make use of a narrow spring-bearer, R, that is attached to the lower end of the stationary axle E, and made to extend upward and rest on the work as seen in Fig. 3. For the purpose of making ribbed work, I employ half the number of needles of the second series that there are of the first, and arrange them as seen in the drawing. When a row of stitches is cast on each series of needles and the machine is set to work, it will knit a ribbed tubular fabric. I do not limit my invention to such a proportion of needles in both series.

What I claim as my invention, and desire to secure by Letters Patent, is—

1. The sliding detached needles, in combination with a cam or its equivalent for operating two, three, four, or more of them at one and the same time, substantially as described.

2. The series of ribbing-needles, in combination with the plain needles of a circular-knitting machine, operating in the manner substantially as set forth, for the purpose specified.

3. Making a part of the cam or lip which actuates the ribbed needles removable, for the purpose of introducing and withdrawing the needles, as set forth.

4. Making a part of the lip of the cam-plate adjustable, for the purpose of varying the length of the stitches as required.

5. Inclining the plane of one series of needles to the plane of rotation of the other series, for the purpose set forth.

JOHN PEPPER.

Witnesses:
J. L. WILSON,
T. W. WRIGHT.